United States Patent [19]

Tamura et al.

[11] Patent Number: 4,529,763

[45] Date of Patent: Jul. 16, 1985

[54] AROMATIC POLYAMIDE COMPOSITION AND PROCESSES FOR PREPARING FILM AND FIBER THEREFROM

[75] Inventors: Yorikazu Tamura; Akihiro Aoki; Keizo Shimada, all of Iwakuni, Japan

[73] Assignee: Teijin Limited, Osaka, Japan

[21] Appl. No.: 482,817

[22] Filed: Apr. 7, 1983

Related U.S. Application Data

[60] Continuation of Ser. No. 263,362, May 14, 1981, abandoned, which is a division of Ser. No. 94,594, Nov. 15, 1979, abandoned.

[30] Foreign Application Priority Data

Nov. 21, 1978 [JP] Japan ................. 53-142818

[51] Int. Cl.$^3$ .............................................. C08K 5/20
[52] U.S. Cl. .................... 524/230; 524/233; 524/234; 528/488
[58] Field of Search ............. 528/488; 524/230, 233, 524/234

[56] References Cited

U.S. PATENT DOCUMENTS

| | | | |
|---|---|---|---|
| 2,576,909 | 12/1951 | Adams | 528/488 |
| 3,058,962 | 10/1962 | Trofimow | 528/488 |
| 3,249,569 | 5/1966 | Fantl | 528/488 |
| 3,251,802 | 5/1966 | Pinter | 528/488 |
| 3,414,645 | 12/1968 | Morgan | 524/233 |
| 3,931,119 | 1/1976 | Leblanc | 524/233 |
| 4,011,203 | 3/1977 | Konomi | 524/233 |

*Primary Examiner*—Paul R. Michl
*Attorney, Agent, or Firm*—Burgess, Ryan and Wayne

[57] ABSTRACT

There is provided an aromatic polyamide composition, which comprises (a) a polyamide, the recurring structural units of which are substantially totally aromatic, (b) an organic amide solvent, and (c) one or more salts selected from chlorides and bromides of an alkali metal, an alkaline earth metal or ammonium. The amounts of the polyamide and the organic amide solvent are in the ranges of 30 to 50% and 70 to 50% by weight, respectively, based on the total weight of the polyamide and the organic amide solvent. The amount of the salt is defined by the formulae:
in the case where $30 \leq x \leq 33.6$, $y \geq 10$, and
in the case where $33.6 < x \leq 50$, $y > 2.8x - 84$
wherein "x" is the amount in % by weight of the polyamide based on the total weight of the polyamide and the organic amide solvent, and "y" is the amount in % by mole of the salt based on the polyamide. The polyamide composition is useful for melt-shaping films, fibers and other shaped articles.

13 Claims, No Drawings ized and insolubilized at a high concentra-
AROMATIC POLYAMIDE COMPOSITION AND PROCESSES FOR PREPARING FILM AND FIBER THEREFROM This application is a continuation of application Ser. No. 263,362, filed May 14, 1981, now abandoned, which is a division of application Ser. No. 94,594, filed Nov. 15, 1979, now abandoned.

BACKGROUND OF THE INVENTION (1) Field of the Invention

The present invention relates to an aromatic polyamide composition. More particularly, it relates to an aromatic polyamide compostion having incorporated therein a solubilizing aid and an amide solvent. This aromatic polyamide composition exhibits good thermal stability and is useful for melt shaping. The present invention also relates to a process for preparing a film from the aromatic polyamide composition.

(2) Description of the Prior Art

Aromatic polyamides possess good thermal resistance, and hence, in recent years, they have been widely used as apparel materials, electrical insulants and other industrial materials in the form of fibers, films, paper and other shaped articles. It is, however, difficult or even impossible to make shaped articles from aromatic polyamides by a melt shaping procedure. This is because aromatic polyamides generally possess very high melting points and the melting points are in a close vicinity to their thermal decomposition points. Thus, conventional aromatic polyamide shaped articles are made by a wet- or dry-shaping procedure wherein the polymer is dissolved in an organic polar solvent such as dimethylformamide, N-methyl-2-pyrrolidone or dimethylacetamide, and the obtained polymer dope is extruded through a nozzle or die into a liquid or gas atmosphere followed by the removal of the solvent from the extrudate. The wet- or dry-shaping procedure is not advantageous in that, first, a large amount of an organic polar solvent is needed for the preparation of the polymer dope, and secondly, a large amount of another organic solvent must be used for the recovery of the organic polar solvent used.

Attempts have been heretofore made wherein an aromatic polyamide is dissolved in a relatively small amount of an organic polar solvent and the obtained polymer dope of a high concentration is extruded at a relatively high temperature. However, as far as poly-m-phenyleneisophthalamide is concerned, these attempts were not successful. This is because poly-m-phenyleneisophthalamide exhibits a marked tendency of being crystallized and insolubilized at a high concentration and a high temperature.

It also has been proposed as disclosed in Japanese Laid-open Patent Applications Nos. 13,543/1977, 15,675/1977, 53,068/1977, 98,764/1977 and 101,298/1977 that poly-m-phenyleneisophthalamide or a copolyamide mainly comprised of m-phenyleneisophthalamide units be dissolved in an excess of an organic polar solvent such as N-methyl-2-pyrrolidone, hexamethylphosphoramide, 2-pyrrolidone or ε-caprolactam, and then, the obtained solution is heated under vacuum to remove a substantial part of the solvent therefrom. The resultant product is a crystalline polymeric complex possessing a relatively low melting point, which complex is melt-shapable. This proposed process is still not satisfactory. That is, first, a very large amount of the organic polar solvent must be used for the preparation of the polymer solution and a substantial part of the solvent, which has generally a relatively high boiling point, must be evaporated from the prepared polymer solution requiring a large heat energy. Secondly, the crystalline polymeric complex is poor in thermal stability and hence, the melt-shaping thereof must be conducted at a relatively low temperature and completed within a relatively short period of time.

SUMMARY OF THE INVENTION

It is, therefore, the main object of the present invention to provide an aromatic polyamide composition, which contains an aromatic polyamide at a high concentration, namely, contains a relatively small amount of a solvent and which has good thermal stability.

Another object of the present invention is to provide a shaped article, particularly film, possessing good thermal resistance and good mechanical properties.

In one aspect of the present invention there is provided an aromatic polyamide composition which comprises (a) a polyamide, the recurring structural units of which are substantially totally aromatic, (b) an organic amide solvent, and (c) at least one salt selected from the group consisting of chlorides of an alkali metal or an alkaline earth metal, and bromides of an alkali metal, an alkaline earth metal or ammonium; the amounts of the polyamide and the organic amide solvent being in the ranges of from 30% to 50% by weight and from 70% to 50% by weight, respectively, based on the total weight of the polyamide and the organic amide solvent, and the amount of said salt being defined by the formulae:

in the case where $30 \leq x \leq 33.6$, $y \geq 10$, and in the case where $33.6 < x < 50$, $y > 2.8x - 84$ wherein "x" is the amount in % by weight of the polyamide based on the total weight of the polyamide and the organic amide solvent, and "y" is the amount in % by mole of said salt based on the polyamide.

In another aspect of the present invention there is provided a process for preparing a film wherein an aromatic polyamide composition comprised of an aromatic polyamide, an organic amide solvent and a solubilizing aid is extruded by a wet-shaping procedure into a liquid coagulating bath, characterized by using as the aromatic polyamide composition the aromatic polyamide composition defined in the preceding paragraph and further using as the liquid coagulating bath at least one liquid selected from the group consisting of an aqueous inorganic salt solution, a mixed solution of water and an organic solvent, and a halogenated hydrocarbon.

In still another aspect of the present invention there is provided a process for preparing a fiber wherein an aromatic polyamide composition comprised of an aromatic polyamide, an organic amide solvent and a solubilizing aid is extruded by a melt spinning procedure through a spinneret into a gaseous atmosphere, characterized by using as the aromatic polyamide composition the above-defined aromatic polyamide composition.

DESCRIPTION OF THE PREFERRED EMBODIMENTS

The polyamide contained in the aromatic polyamide composition of the invention is such that the recurring structural units of the polyamide are substantially totally aromatic. By the term "substantially totally aromatic" used herein is meant that each of the substantial part of the recurring structural units has one or more aromatic rings. Preferably, at least 85% by mole of the recurring structural units are represented by the general formula:

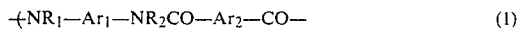

wherein $Ar_1$, $Ar_2$ and $Ar_3$ are divalent aromatic residues (which includes the divalent residue expressed by the formula: $-Ar_4-Y-Ar_5-$ where $Ar_4$ and $Ar_5$ are the same or different divalent aromatic residues and Y is a divalent radical such as $-CH_2-$, $-S-$,

$-SO_2-$ and $-O-$) and may be the same or different, and at least 30% by mole of the total of the $Ar_1$, $Ar_2$ and $Ar_3$ being m-oriented; and $R_1$, $R_2$ and $R_3$ are hydrogen or an alkyl group having 1 to 3 carbon atoms and may be the same or different.

$Ar_1$, $Ar_2$, $Ar_3$, $Ar_4$ and $Ar_5$ in the above-mentioned formulae include, for example,

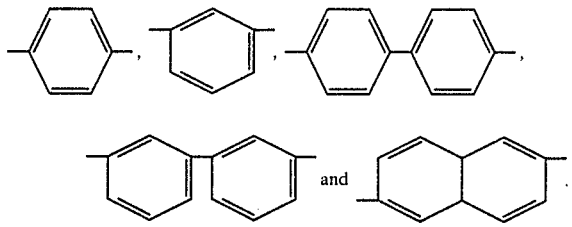

Each of these aromatic rings may have one or more substituents such as halogen atoms and lower alkyl groups having 1 to 3 carbon atoms, which substituents are bound directly to the aromatic ring.

More preferably, the polyamide contained in the aromatic polyamide composition of the invention is either poly-m-phenyleneisophthalamide or a copolyamide comprised of at least 75% by mole of m-phenyleneisophthalamide unit and not more than 25% by mole of at least one other aromatic amide unit.

The m-phenyleneisophthalamide unit is formed by polycondensation of m-phenylenediamine with a functional derivative of isophthalic acid, e.g., isophthaloyl halide such as isophthaloyl chloride. The above-mentioned other aromatic amide unit is formed by polycondensation of one or more of the following aromatic diamine ingredients with one or more functional derivatives (such as halides and esters) of the following aromatic dicarboxylic acid ingredients, except for the combination of m-phenylenediamine with isophthalic acid. The aromatic diamine ingredients used include, for example, m-phenylene diamine, p-phenylenediamine, benzidine, 4,4'-diaminodiphenyl ether, xylylenediamine, toluenediamine and 4,4'-diaminodiphenylsulfone. The aromatic dicarboxylic acid halide ingredients used include, for example, isophthalic acid, terephthalic acid, 1,4-naphthalenedicarboxylic acid, 2,6-naphthalenedicarboxylic acid, diphenylsulfone-4,4'-dicarboxylic acid and 4,4'-diphenyldicarboxylic acid.

The substantially totally aromatic polyamide can be prepared by any conventional polymerization procedures such as a solution polymerization procedure, an interfacial polymerization procedure and a prepolymer polymerization procedure. Typical examples of the solution, interfacial and prepolymer polymerization procedures are disclosed in Japanese Patent Publications Nos. 14,399/1960, 13,247/1960 and 10,863/1972.

The organic amide solvent contained in the aromatic polyamide composition of the invention is selected from those which are capable of dissolving the aforesaid substantially totally aromatic polyamide at ambient temperature in the presence or absence of the solubilizing aid, mentioned below. The amide solvents used include, for example, tetramethylurea, hexamethylphosphoramide, N,N-dimethylacetamide, N-methylpyrrolidone-2, N-methylpiperidone-2, N,N-dimethyleneurea, N,N,N',N'-tetramethylmalonamide, N-methylcaprolactam, N-acetylpyrrolidine, N,N-diacetylacetamide, N-ethylpyrrolidone-2, N,N-dimethylpropionamide, N,N-dimethylisobutyramide, N,N-dimethylpropyleneurea and N,N-dimethylformamide. These amide solvents may be used either alone or in combination. Of these amide solvents, N-methylpyrrolidone-2, N,N-dimethylacetamide and their mixtures are preferable.

The amounts of the aforesaid aromatic polyamide and the organic amide-solvent are from 30% to 50% by weight and from 70% to 50%, respectively, based on the total weight of the aromatic polyamide and the amide solvent. Preferable amounts of the aromatic polyamide and the amide solvent are from 30% to 45% by weight and from 70% to 55%, respectively. When the amount of the aromatic polyamide is less than 30% by weight, the aromatic polyamide composition has a low solution viscosity and hence, only limited methods and conditions can be employed for manufacturing shaped articles from the polyamide composition. In addition, the use of a large amount, i.e. more than 70% by weight, of the amide solvent is costly. In contrast, when the amount of the polyamide exceeds 50% by weight, the aromatic polyamide composition exhibits an extraordinarily high solution viscosity and is difficult to shape. In general, when the amount of the polyamide is at least about 35% by weight based on the total weight of the polyamide and the solvent, the aromatic polyamide composition is solid at normal temperatures.

The salt incorporated in the aromatic polyamide composition functions as a solubilizing aid. The salt is selected from chlorides of an alkali metal or an alkaline earth metal, and bromides of an alkali metal, an alkaline earth metal or ammonium. Illustrations of the salt are lithium chloride, calcium chloride, magnesium chloride, lithium bromide, calcium bromide and ammonium bromide. These salts may be used either alone or in combination.

The amount of the salt varies depending upon the concentration of the aforesaid aromatic polyamide in the aromatic polyamide composition. That is, the amount of the salt is defined by the formulae:

in the case where $30 \leq x \leq 33.6$, $y \geq 10$, and in the case where $33.6 < x \leq 50$, $y > 2.8x - 84$ wherein "x" is the amount in % by weight of the polyamide based on the total weight of the polyamide and the organic amide solvent, and "y" is the amount in % by mole of the salt based on the polyamide. The "y" is calculated assuming that recurring structural unit

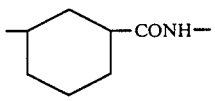

(M.W.=119) of the polyamide is one mole, namely, 119 g of the polyamide is one mole.

When the amount of the salt is less than the above-defined minimum permissible limit, the aromatic polyamide composition exhibits a poor thermal stability. The above-defined minimum permissible limit can be a criterion as to whether the aromatic polyamide composition exhibits a significant change or not when the composition is maintained at a temperature of 120° C. over a period of 30 minutes. The more the amount of the salt, the higher the thermal stability of the aromatic polyamide composition. There is no critical upper limit in the amount of the salt, but the amount of the salt should preferably be not more than 60% by weight, more preferably not more than 50% by weight, based on the weight of the polyamide. When the amount of the salt is extraordinarily large, the aromatic polyamide composition exhibits an extremely high solution viscosity as well as an enhanced hygroscopicity, and thus, is difficult to shape.

As hereinbefore referred to, poly-m-phenyleneisophthalamide or a copolyamide mainly comprised of m-phenleneisophthalamide units has a marked tendency of being crystallized and insolubilized at a high concentration and at a high temperature. Such phenomenon is usually observed at a temperature higher than 100° C. and at a concentration of more than 25% by weight. Furthermore, it is known that the incorporation of metal salts, such as lithium chloride and calcium chloride, in a poly-m-phenyleneisophthalamide solution enhances the solubility of poly-m-phenyleneisophthalamide and the stability of the solution, provided that the concentration of the polyamide is low. (For example, see Japanese Patent Publication No. 815/1967). It is, however, surprising that a thermally resistant and stable polyamide composition which contains at least 30% by weight, based on the total weight of the polyamide and the solvent, of the polyamide, and which is solid at a normal temperature and exhibits fluidity at an elevated temperature, can be obtained by the incorporation of the above-specified amount of the salt.

If desired, the aromatic polyamide composition of the invention may have suitable amounts of various modifiers and other additives. Such additives include, for example, light stabilizers, heat stabilizers, antioxidants, crosslinking agents, flame-or fire-retardants, ultraviolet screeners, antislatic agents, delusterants, dyes and pigments and other colorants, fillers or reinforcing agents, plasticizers and solution viscosity modifiers.

The aromatic polyamide composition of the invention can be prepared by various conventional methods. In one preferable method, the predetermined amounts of the polyamide, the amide solvent and the solubilizing aid (the salt) are blended together to form a homogeneous solution. Preferably, the solubilizing aid is dissolved in the amide solvent, and then, the polyamide is incorporated under cold conditions in the solubilizing aid solution. In some cases the entire amount of the solubilizing aid cannot completely be dissolved in the amide solvent, which depends upon the particular type of the amide solvent and the amount of the amide solvent. However, when the polyamide is incorporated in the solution having the solubilizing aid partially dissolved therein, the solubilizing aid can usually be dissolved. It is also possible that the solubilizing aid and the polyamide are first mixed together both in the form of a powder to obtain a uniform powder mixture, and then, the mixture is incorporated in the amide solvent under cold conditions.

In another preferable method, an aromatic diamine and an aromatic dicarboxylic acid halide are polycondensed in an organic amide solvent medium by a solution polymerization procedure to prepare a polyamide solution (as disclosed, for example, in Japanese Patent Publication No. 14,399/1960), and then, an alkali is incorporated in the polymide solution whereby hydrogen halide present in the polyamide solution is neutralized to be converted to the solubilizing aid (as taught, for example, in Japanese Patent Publication No. 16,027/1960).

The aromatic polyamide composition of the present invention is generally viscous liquid or solid at a normal temperature. In the temperature range of from approximately 80° C. to the boiling point of the solvent, the polyamide composition exhibits good fluidity and is thermally stable. Thus, the polyamide composition can be melt-shaped into various articles such as fibers, films and sheets by using a conventional shaping apparatus. The melt-shaping temperature may suitably be chosen in the range of from approximately 60° to 180° C. depending upon the particular polyamide composition and the melt-shaping apparatus used. At a lower melt-shaping temperature, the resulting shaped articles are not homogeneous and their productivity is very low. In contrast, at a higher temperature, the polyamide composition is liable to be colored or have minute bubbles formed from trace amounts of water, during melt-shaping. The amide solvent and the solubilizing aid, contained in the shaped articles can be readily removed, if desired, by immersing the shaped articles in cold or hot water or an organic solvent.

The process for preparing a film from the aforesaid aromatic polyamide composition will be described in detail.

The polyamide composition is melt-shaped to a film by a wet-shaping procedure. That is, the polyamide composition is extruded through a slit-nozzle or a T-die, and then, the film-like extrudate is introduced into a liquid coagulating bath. The polyamide composition may be extruded directly into a liquid coagulating bath. Alternatively, the polyamide composition may be extruded first into the air, and, after running for a certain period of time in the air, the film-like extrudate is introduced into a liquid coagulating bath. The former method is usually employed for the polyamide composition containing a relatively small amount of the polyamide, and the latter method is usually employed for the polyamide composition containing a relatively large amount of the polyamide. In the latter method, the length, over which the extruded polyamide composition is passed through the air, may be varied usually in the range of from 5 mm to 300 mm, more preferably from 10 mm to 200 mm. The latter method is advantageous over conventional polyamide film-forming methods in that:

(1) a polyamide composition of a high polymer concentration, i.e., containing a minor amount of the amide solvent, can be used and, therefore, this method is less costly, (2) the polyamide composition can be extruded at an enhanced extrusion rate by using a shaping apparatus similar to a conventional melt-shaping apparatus, (3) the resulting film is transparent and homogeneous even when the film is thick, (4) the energy consumption is small, and (5) the process is simple as compared with a conventional process wherein a solubilizing aid-containing polyamide solution is extruded by a dry-shaping procedure and the coagulated extrudate is washed for the removal of the solubilizing aid and the solvent.

As the liquid coagulating bath, one or more of the following baths are advantageously used: (i) aqueous inorganic salt solution baths, (ii) aqueous organic solvent solution baths and (iii) halogenated hydrocarbons.

The inorganic salts used for the preparation of the aforesaid baths (i) include, for example, calcium chloride, barium chloride, zinc chloride, magnesium chloride, sodium chloride, potassium chloride, aluminum chloride, tin chloride, nickel chloride, strontium chloride, lithium chloride, calcium bromide, lithium bromide, calcium nitrate, zinc nitrate, aluminum nitrate, calcium thiocyanate, potassium thiocyanate and sodium thiocyanate. Of these salts, calcium chloride, lithium chloride, magnesium chloride and zinc chloride are preferable. Lithium chloride and calcium chloride are optimum. It is more advantageous that the inorganic salt used as the coagulant is the same as the salt used as the solubilizing aid.

The concentration of the inorganic salt in the coagulating bath varies depending upon the composition of the polyamide composition, the inorganic salt and the shaping conditions, and is usually at least 20% by weight, preferably in the range of from 20% to 60% by weight, based on the weight of the coagulating bath, for the desired film possessing good mechanical properties and transparency. The coagulating temperature, the immersion time and the composition of the coagulating bath may suitably be varied depending upon the intended film thickness and transparency. A preferable temperature of the coagulating bath is in the range of from 40° to 110° C.

As the organic solvent used for the preparation of an aqueous organic solvent solution bath, various alcohols and amide solvents can be used. Of the alcohols, glycerin and alkylene glycols such as ethylene glycol, propylene glycol, polyethylene glycol and polypropylene glycol are preferable. The concentration of the organic solvent in the coagulating bath varies depending upon the organic solvent, the aromatic polyamide composition, the shaping procedure and the shaping conditions. When polyalkylene glycol or glycerin is used, its concentration is preferably at least 30% by weight, more preferably in the range of from 30% to 90% by weight, based on the weight of the coagulating bath. When the amide solvent is used, its concentration is preferably at least 5% by weight, more preferably in the range of from 5% to 60% by weight, based on the weight of the coagulating bath. The coagulating temperature also varies depending upon various factors, but is chosen generally in the range of from 30° C. to the boiling point of the coagulating bath.

The halogenated hydrocarbons, which can also be used as the coagulating bath, include, for example, methylene chloride, dihloroethane, tetrachloroethane, dichloroethylene, tetrachloroethylene, chloroform, carbon tetrachloride, chlorocyclohexane and chlorobenzene. Of these halogenated hydrocarbons, methylene chloride, dichloroethane, chloroform, carbon tetrachloride and chlorobenzene are preferable. Methylene chloride and dichloroethane are optimum.

The above-mentioned liquid coagulating baths may be used alone. Alternatively, two or more liquid coagulating baths, arranged in series, may be employed (one or more of which baths may be other than the aforesaid three baths (i), (ii) and (iii)). In one preferable embodiment of such a multi-coagulating bath system, a first aqueous coagulating bath comprised of water or an aqueous organic or inorganic compound solution and a second aqueous coagulating bath comprised of an aqueous inorganic salt solution are employed.

The above-mentioned first coagulating bath is preferably comprised of an aqueous solution containing the amide solvent and the metal halide salt, which solvent and salt are extracted from the extruded aromatic polyamide composition. This aqueous solution is advantageous from a standpoint of the solvent recovery. The concentration of the solvent in this solution may be chosen in the range of from 0 to 40% by weight, preferably from 0 to 20% by weight, although the optimum concentration varies depending upon the type of the polyamide, the polymerization degree of the polyamide and the concentration of the polyamide in the polyamide composition. The temperature of the first coagulating bath may be chosen in the range of from −10° to 120° C., although the optimum temperature varies depending upon the composition of the first coagulating bath. When the first coagulating bath is maintained at an extraordinarily high temperature, the film-like extrudate loses its clarity to a conspicuous degree in the first coagulating bath, and consequently, the finally resulting film is brittle and poor in luster and tensile strength. The immersion time in the first coagulating bath is preferably in the range of from 5 to 500 seconds, although the suitable time varies depending upon the composition of the aromatic polyamide composition and the polyamide. When the immersion time in the first coagulation bath is too short, the film-like extrudate is liable to be distorted during the immersion in the first coagulating bath or between the first and second coagulating baths. In contrast, when the immersion time is too long, the heterogeneous structure of the coagulated extrudate possessing microvoids, which structure is formed in the first coagulation bath, cannot completely be reformed to the desired homogeneous and densified structure in the second coagulation bath.

The above-mentioned second aqueous coagulating bath has a function of reforming the heterogeneous structure of the coagulated extrudate possessing microvoids to the desired homogeneous and densified structure resulting in a lustrous film. The inorganic salts contained in the second coagulating bath are soluble salts such as, for example, calcium chloride, magnesium chloride, zinc chloride, magnesium nitrate, nickel chloride, lithium chloride, sodium chloride, strontium chloride, aluminum chloride, stannic chloride, calcium bromide, calcium nitrate, aluminum nitrate and zinc nitrate. These salts may be used alone or in combination. The concentration of the salt is preferably at least 6 gram equivalents per liter of water, expressed in terms of the anhydrous salt. The temperature of the second coagulating bath is preferably at least 60° C., more preferably at least 80° C. An optimum second coagulating bath is an aqueous solution containing at least 8 gram equivalents of calcium chloride per liter of water and maintained at least 60° C., particularly at least 80° C.

Instead of the above-explained combination of the first and second aqueous coagulation baths, the following combination is also preferably used, which comprises a first aqueous coagulating bath comprised of an aqueous calcium chloride solution having a concentration of from 30% to 50% by weight, and a second aqueous coagulating bath comprised of water or an aqueous solution of an inorganic salt of an amide solvent, maintained at a temperature of from 0° to 100° C.

One or more additional aqueous coagulating baths may be used in order to completely remove the solvent and the solubilizing aid from the extrudate and completely coagulate the extrudate. Usually, one or more washing baths are arranged after the coagulation baths. The conditions, under which the extrudate is coagulated and washed, vary mainly depending upon the type of the wet shaping procedure, the extrusion temperature, the distance of the air through which the molten extrudate runs, the drafting ratio, the composition and temperature of the coagulating and washing baths, the immersion length and time in the respective baths, the contents of the amide solvent in the polymer composition and in the coagulating both, and the drawing ratio.

The washed film may be practically used as it is. However, in order to impart to the film the desired mechanical properties such as tenacity and elongation, the electrically insulating characteristics and the thermal resistance, it is advantageous that the washed film be drawn in hot water or under dry heat condition or heat-treated under tension. The drawing may be carried out either uniaxially, i.e., in a longitudinal or transverse direction, or biaxially, i.e., in longitudinal and transverse directions. The biaxial drawing may be either simultaneous or sequential.

The process for preparing a fiber from the aforesaid polyamide composition will be described in detail.

The polyamide composition is extruded into the gaseous atmosphere through a spinneret having one or more orifices and maintained at a suitable melt-spinning temperature. The gaseous atmosphere includes the air and other inert gaseous atmospheres. The extruded filaments are (i) passed through the gaseous atmosphere over a short length, and immediately thereafter, introduced into a coagulating bath comprised of a liquid capable of coagulating the polyamide composition; or (ii) passed through the gaseous atmosphere over a length sufficient for cooling the extruded filaments to a certain extent, and then, if desired, a coagulating liquid is applied thereto or the filaments are introduced in a coagulating liquid bath in order to prevent the filaments from sticking to each other; or (iii) passed through the gaseous atmosphere which has contained therein vapor of a coagulating liquid, such as steam.

When the polyamide composition is in a semi-solid form, a spinning procedure similar to a conventional melt-spinning procedure can be advantageously employed.

As the organic solvent used for the preparation of an aqueous organic solvent solution bath, various alcohols and amide solvents can be used. Of the alcohols, glycerin; alkylene glycols such as ethylene glycol, propylene glycol, polyethylene glycol and polypropylene glycol; and monohydric alcohols such as isopropyl alcohol, butyl alcohol and benzyl alcohol are preferable. The concentration of the organic solvent in the coagulating bath varies depending upon the organic solvent, the aromatic polyamide composition, the spinning procedure and the spinning conditions. When polyalkylene glycol or glycerin is used, its concentration is preferable at least 30% by weight, more preferably in the range of from 30% to 90% by weight, based on the weight of the coagulating bath. The coagulation temperature also varies depending upon various factors, but is chosen generally in the range of from 30° C. to the boiling point of the coagulating bath.

The halogenated hydrocarbons, which can also be used as the coagulating bath, include, for example, methylene chloride, dichloroethane, tetrachloroethane, dichloroethylene, tetrachloroethylene, chloroform, carbon tetrachloride, chlorocyclohexane and chlorobenzene. Of these halogenated hydrocarbons, methylene chloride, dichloroethane, chloroform, carbon tetrachloride and chlorobenzene are preferable. Methylene chloride and dichloroethane are optimum.

The above-mentioned liquid coagulating baths may be used alone. Alternatively, two or more liquid coagulating baths, arranged in series, may be employed. In one preferable embodiment of such a multi-coagulating bath system, a first aqueous coagulating bath comprised of water maintained at room temperature and a second aqueous coagulating bath comprised of an aqueous calcium chloride solution of from 30% to 50% concentration and maintained at 70° C. to 110° C. This two-coagulating bath system is useful particularly for preparing a homogeneous and lustrous filaments having little or no loss of clarity from a polyamide composition having a relatively low polyamide concentration.

The coagulated filaments may be taken up on a roll, followed by being subjected to the subsequent treating steps such as washing and drawing. Alternatively, the coagulated filaments may be continuously subjected to the subsequent treating steps.

The drawing of the filaments is preferably carried out by a two stage drawing process. In the first stage, the filaments still containing the organic solvent may be drawn, for example, (i) on a hot pin in the air, (ii) in hot water or (iii) in steam. In the second stage, the filaments may be, after being completely washed to remove the solvent therefrom and then dried, drawn at a higher temperature.

The process for preparing fibers from the aromatic polyamide composition of the invention by the above-mentioned melt spinning is advantageous in the following over conventional processes wherein aromatic polyamide compositions are extruded into filaments by a wet or dry spinning procedure.

(1) A polyamide composition of a high polymer concentration, i.e., containing a minor amount of the amide solvent, is used and, therefore, this process is less costly. In a conventional dry spinning process, high energies are necessary for removing a relatively large amount of the solvent from the extruded filaments, and the spinning apparatus is not simple.

(2) The polyamide composition can be extruded at an enhanced extrusion rate and the productivity is high.

(3) Homogeneous thick filaments having a single filament fineness of from 20 de to 1,000 de can be obtained.

As a coagulating liquid, water maintained at room temperature or lower temperature may be employed. However, the following liquids are advantageously employed: (i) aqueous inorganic salt solutions, (ii) aqueous organic solvent solutions and (iii) halogenated hydrocarbons.

The inorganic salts used for the preparation of the aforesaid solutions (i) include, for example, those hereinbefore listed with respect to the preparation of films. Of these salts, calcium chloride, lithium chloride, magnesium chloride and zinc chloride are preferable. Lithium chloride and calcium chloride are optimum. It is more advantageous that the inorganic salt used as the coagulant is the same as the salt used as the solubilizing aid.

The concentration of the inorganic salt in the coagulating solutions varies depending upon the composition of the polyamide composition, the inorganic salt and the spinning conditions, and is usually at least 20% by weight, more preferably in the range of from 20% to 60% by weight, based on the weight of the coagulating solution. A preferable temperature of the coagulating inorganic salt solution is in the range of from 40° to 110° C.

To further illustrate the invention, non-limitative examples and comparative examples are set forth below. In the examples and comparative examples percents and parts are by weight unless otherwise specified. Furthermore, the examples and comparative examples, measurement of the logarithmic viscosity (referred to as "η inh" for brevity) as was carried out at 30° C. on a solution of 0.5 g of polymer in 100 ml of concentrated sulfuric acid. In addition the measurement of the intrinsic viscosity was carried out at 30° C. on a polymer solution of 0.5% concentration in N-methyl-2-pyrrolidone.

EXAMPLE 1

Five parts of finely divided poly-m-phenyleneisophthalamide containing 3% by mole of terephthalic acid units, and having an intrinsic viscosity of 1.36, and 0.47 part of finely divided lithium chloride having a particle size of finer than 200 mesh were completely mixed with each other. 8.33 parts of a lithium chloride solution of a 10% concentration in dimethylacetamide were incorporated, while being cooled in an ice bath, into the above-mentioned mixture. Then, the mixture was kneaded to obtain a mixture in the form of a paste. The paste was left to stand at an ordinary temperature for 10 hours to obtain a solid polymer composition.

In the solid polymer composition, the amounts of the polymer and the amide solvent were 40% and 60%, repectively, based on the total weight of the polymer and the amide solvent. Furthermore, the amount of lithium chloride was 73% by mole (26% by weight) based on the polymer, which amount was larger than the claimed minimum permissible amount, i.e., 28% by mole based on the polymer.

The flow properties of the solid polymer composition were tested by using a flow tester provided with a nozzle having an orifice 0.5 mm in diameter and an L to D ratio of 8. The solid polymer composition started to flow at a temperature of 80° C. and a shear stress of $3.0 \times 10^5$ dyn/cm$^2$. The melt viscosities are shown in Table I, below. The extrudates were clear solids at ordinary temperatures.

The above-mentioned solid polymer composition could be formed into tough films and fibers by melt-extruding the composition at a temperature of 140° C., followed by the removal of the salt and the solvent, in a conventional manner.

TABLE I

| Temperature | Melt Viscosities of Polymer (poise) | | |
|---|---|---|---|
| | Shear rate (sec$^{-1}$) | | |
| (°C.) | 100 | 500 | 1,000 |
| 100 | 6,500 | 2,800 | 1,940 |
| 120 | 4,500 | 1,740 | 1,250 |
| 140 | 3,800 | 1,470 | 970 |

EXAMPLES 2 THROUGH 14 AND COMPARATIVE EXAMPLES 1 TO 6

Following a procedure similar to that mentioned in Example 1, polymer compositions were prepared and their flow properties were tested. In the preparation of the polymer compositions, the amounts of poly-m-phenyleneisophthalamide, dimethylacetamide and lithium chloride were varied as shown in Table II, below, with all other conditions remaining substantially the same. The flow properties of the polymer compositions are shown in Table II, below.

TABLE II

| | Amount of polymer (wt. %) | Amount of amide solvent (wt. %) | Amount of LiCl*[1] (wt. %) | Amount of LiCl*[1] (mole %) | Claimed minimum permissible amount of LiCl*[1] (mole %) | viscosity (poise) at 120° C. and at shear rate of 500 sec$^{-1}$ |
|---|---|---|---|---|---|---|
| Ex. 2 | 30 | 70 | 5 | 14 | 10 | 130 |
| Ex. 3 | 30 | 70 | 10 | 28 | 10 | 150 |
| Ex. 4 | 30 | 70 | 20 | 56 | 10 | 200 |
| Comp. Ex. 1 | 30 | 70 | 3 | 8.4 | 10 | Crystallized and insolubilized at 120° C. for 30 min. |
| Ex. 5 | 35 | 65 | 10 | 28 | 14 | 380 |
| Ex. 6 | 35 | 65 | 15 | 42 | 14 | 440 |
| Ex. 7 | 35 | 65 | 20 | 56 | 14 | 500 |
| Comp. Ex. 2 | 35 | 65 | 5 | 14 | 14 | Crystallized and insolubilized at 120° C. for 30 min. |
| Ex. 8 | 40 | 60 | 15 | 42 | 28 | 1,400 |
| Ex. 9 | 40 | 60 | 20 | 56 | 28 | 1,670 |
| Ex. 10 | 40 | 60 | 30 | 84 | 28 | 1,500 |
| Ex. 11 | 40 | 60 | 40 | 112 | 28 | 2,050 |
| Comp. Ex. 3 | 40 | 60 | 5 | 14 | 28 | Crystallized and insolubilized at ordinary temperatures |
| Comp. Ex. 4 | 40 | 60 | 10 | 28 | 28 | Crystallized and insolubilized at 120° C. for 30 min. |
| Ex. 12 | 45 | 55 | 20 | 56 | 42 | 2,800 |
| Ex. 13 | 45 | 55 | 30 | 84 | 42 | 3,400 |
| Ex. 14 | 45 | 55 | 40 | 112 | 42 | 6,800 |
| Comp. Ex. 5 | 45 | 55 | 10 | 28 | 42 | Crystallized and insolubilized at ordinary temperatures |

TABLE II-continued

|  | Amount of polymer (wt. %) | Amount of amide solvent (wt. %) | Amount of LiCl*[1] (wt. %) | Amount of LiCl*[1] (mole %) | Claimed minimum permissible amount of LiCl*[1] (mole %) | viscosity (poise) at 120° C. and at shear rate of 500 sec$^{-1}$ |
|---|---|---|---|---|---|---|
| Comp. Ex. 6 | 45 | 55 | 15 | 42 | 42 | Crystallized and insolubilized at 120° C. for 30 min. |

*[1] % based on the polymer

EXAMPLE 15

Following a procedure similar to that mentioned in Example 1, a polymer composition was prepared wherein dimethylformamide was used instead of dimethylacetamide. That is, 5 parts of finely divided poly-m-phenyleneisophthalmide containing 3% by mole of terephthalic acid units and having an intrinsic viscosity of 1.36 were mixed with 8.53 parts of a lithium chloride solution of a 12% concentration in dimethylformamide, while the solution was cooled in a dry ice-acetone bath. Then, the mixture was kneaded into a paste. The paste was allowed to stand at an ambient temperature for 10 hours to obtain a solid polymer composition.

In the solid polymer composition, the amounts of the polymer and the amide solvent were 40% and 60%, respectively, based on the total weight of the polymer and the amide solvent. Furthermore, the amount of lithium chloride was 57.5% by mole (20.5% by weight) based on the polymer, which amount was larger than the claimed minimum permissible amount.

The test of the flow properties of the solid polymer composition using the flow tester mentioned in Example 1 showed that the solid polymer mixture started to flow at a temperature of 80° C. and a shear stress of $3.0 \times 10^5$ dyn/cm$^2$, and exhibited the melt viscosities shown in Table III, below.

TABLE III

| Melt Viscosities of Polymer Composition (poise) | | | |
|---|---|---|---|
| Temperature (°C.) | Shear rate (sec$^{-1}$) | | |
|  | 100 | 500 | 1,000 |
| 100° C. | 8,000 | 2,600 | 1,600 |
| 120° C. | 5,400 | 1,800 | 1,100 |
| 140° C. | 3,300 | 1,200 | 780 |

The change of the melt viscosity of the polymer composition was observed while the polymer composition was maintained at a temperature of 120° C. and a shear stress of $6.1 \times 10^5$ dyne/cm$^2$. The results are shown in Table IV, below. It will be understood from these results that the polymer composition exhibited a viscosity change only to a minor extent during three hours, that is, that it possessed excellent thermal stability.

TABLE IV

| Melt Viscosity Change | |
|---|---|
| Time (min) | Viscosity (poise) at 120° C. and Shear stress of $6.1 \times 10^5$ dyn/cm$^2$ |
| 3 | 4,300 |
| 30 | 4,500 |
| 60 | 4,400 |
| 120 | 5,000 |
| 180 | 4,800 |

EXAMPLES 16 THROUGH 28 AND COMPARATIVE EXAMPLES 7 THROUGH 11

Following a procedure similar to that mentioned in Example 15, polymer compositions were prepared and their flow properties were tested. In the preparation of the polymer compositions, the amounts of poly-m-phenyleneisophthalamide, dimethylformamide and lithium chloride were varied as shown in Table V, below. In some of these examples and comparative examples, a part of the finely divided lithium chloride, which part was a finely divided powder having a particle size of finer than 200 mesh, was previously mixed with the finely divided polymer in a manner similar to that mentioned in Example 1. All other conditions remained substantially the same as those mentioned in Example 15. The flow properties of the polymer compositions are shown in Table V, below.

TABLE V

|  | Amount of polymer (wt. %) | Amount of amide solvent (wt. %) | Amount of LiCl*[1] (wt. %) | Amount of LiCl*[1] (mole %) | Claimed minimum permissible amount of LiCl*[1] (mole %) | Viscosity (poise) at 120° C. and at shear rate of 500 sec$^{-1}$ |
|---|---|---|---|---|---|---|
| Ex. 16 | 30 | 70 | 5 | 14 | 10 | 270 |
| Ex. 17 | 30 | 70 | 20 | 56 | 10 | 400 |
| Comp. Ex. 7 | 30 | 70 | 3 | 8.4 | 10 | Crystallized and insolubilized at 120° C. for 30 min. |
| Ex. 18 | 35 | 65 | 10 | 28 | 14 | 620 |
| Ex. 19 | 35 | 65 | 20 | 56 | 14 | 750 |
| Comp. Ex. 8 | 35 | 65 | 5 | 14 | 14 | Crystallized and insolubilized at 120° C. for 30 min. |
| Ex. 20 | 40 | 60 | 17 | 48 | 28 | 1,300 |
| Ex. 21 | 40 | 60 | 26 | 73 | 28 | 1,700 |
| Ex. 22 | 40 | 60 | 37 | 104 | 28 | 2,000 |
| Ex. 23 | 40 | 60 | 47 | 132 | 28 | 3,300 |
| Comp. Ex. 9 | 40 | 60 | 10 | 28 | 28 | Crystallized and insolubilized at 120° C. for 30 min. |
| Ex. 24 | 45 | 55 | 17 | 48 | 42 | 2,700 |
| Ex. 25 | 45 | 55 | 20 | 56 | 42 | 3,100 |
| Ex. 26 | 45 | 55 | 26 | 73 | 42 | 2,900 |
| Ex. 27 | 45 | 55 | 30 | 84 | 42 | 6,100 |
| Comp. Ex. 10 | 45 | 55 | 15 | 42 | 42 | Crystallized and insolubilized at 120° C. for 30 min. |

TABLE V-continued

|  | Amount of polymer (wt. %) | Amount of amide solvent (wt. %) | Amount of LiCl*[1] (wt. %) | (mole %) | Claimed minimum permissible amount of LiCl*[1] (mole %) | Viscosity (poise) at 120° C. and at shear rate of 500 sec$^{-1}$ |
|---|---|---|---|---|---|---|
| Ex. 28 | 50 | 50 | 25 | 70 | 56 | 5,300 |
| Comp. Ex. 11 | 50 | 50 | 20 | 56 | 56 | Crystallized and insolubilized at 120° C. for 30 min. |

*[1] % based on the polymer

EXAMPLES 29 THROUGH 32 and COMPARATIVE EXAMPLES 12 AND 13

Following a procedure similar to that mentioned in Example 15, polymer compositions were prepared and their flow properties were tested. In the preparation of the solid polymer mixtures, calcium chloride was used instead of lithium chloride. A part of the calcium chloride, which part was a finely divided powder having a particle size of finer than 200 mesh, was previously mixed with the finely divided polymer, and the remaining part of the calcium chloride was used in a 5% solution in dimethylformamide. The amounts of the ingredients used and the flow properties of the polymer compositions are shown in Table VI, below.

TABLE VI

|  | Amount of polymer (wt. %) | Amount of amide solvent (wt. %) | Amount of CaCl$_2$*[1] (wt. %) | (mole %) | Claimed minimum permissible amount of CaCl$_2$*[1] (mole %) | Viscosity (poise) at 120° C. and at shear rate of 500 sec$^{-1}$ |
|---|---|---|---|---|---|---|
| Ex. 29 | 40 | 60 | 30 | 32 | 28 | 1,850 |
| Ex. 30 | 40 | 60 | 35 | 38 | 28 | 1,700 |
| Ex. 31 | 40 | 60 | 40 | 43 | 28 | 2,000 |
| Ex. 32 | 40 | 60 | 45 | 48 | 28 | 3,800 |
| Comp. Ex. 12 | 40 | 60 | 20 | 22 | 28 | Crystallized and insolubilized at 120° C. for several min. |
| Comp. Ex. 13 | 40 | 60 | 26 | 28 | 28 | Crystallized and insolubilized at 120° C. for 30 min. |

*[1] % based on the polymer

EXAMPLES 33 THROUGH 37 AND COMPARATIVE EXAMPLES 14 THROUGH 18

Following a procedure similar to that employed in Examples 29, polymer compositions were prepared and their flow properties were tested. In the preparation of the polymer compositions, dimethylacetamide was used instead of dimethylformamide. The amounts of the ingredients used and the flow properties of the polymer compositions are shown in Table VII, below.

TABLE VII

|  | Amount of polymer (wt. %) | Amount of amide solvent (wt. %) | Amount of CaCl$_2$*[1] (wt. %) | (mole %) | Claimed minimum permissible amount of CaCl$_2$*[1] (mole %) | Viscosity (poise) at 120° C. and at shear rate of 500 sec$^{-1}$ |
|---|---|---|---|---|---|---|
| Ex. 33 | 30 | 70 | 15 | 16 | 10 | 500 |
| Ex. 34 | 33 | 67 | 15 | 16 | 10 | 750 |
| Ex. 35 | 35 | 65 | 20 | 22 | 14 | 900 |
| Ex. 36 | 37 | 63 | 25 | 27 | 19.6 | 1,300 |
| Ex. 37 | 40 | 60 | 30 | 32 | 28 | 1,600 |
| Comp. Ex. 14 | 30 | 70 | 9 | 9.6 | 10 | Crystallized and insolubilized at 120° C. for 30 min. |
| Comp. Ex. 15 | 33 | 67 | 9 | 9.6 | 10 | Crystallized and insolubilized at 120° C. for 30 min. |
| Comp. Ex. 16 | 35 | 65 | 10 | 11 | 14 | Crystallized and insolubilized at 120° C. for 30 min. |
| Comp. Ex. 17 | 37 | 63 | 15 | 16 | 19.6 | Crystallized and insolubilized at 120° C. for 30 min. |
| Comp. Ex. 18 | 40 | 60 | 20 | 22 | 28 | Crystallized and insolubilized at 120° C. for 30 min. |

*[1] % based on the polymer

EXAMPLES 38 THROUGH 41 AND COMPARATIVE EXAMPLES 19 THROUGH 23

Following a procedure similar to that mentioned in Example 15, polymer compositions were prepared and their flow properties were tested. In the preparation of the polymer compositions, a lithium chloride solution of a 9% concentration in N-methyl-2-pyrrolidone was used instead of the lithium chloride solution in dimethylformamide. The amounts of the ingredients used and

TABLE VIII

| | Amount of polymer (wt. %) | Amount of amide solvent (wt. %) | Amount of LiCl*[1] (wt. %) | Amount of LiCl*[1] (mole %) | Claimed minimum permissible amount of LiCl*[1] (mole %) | Temperature (°C) | Viscosity (poise) and at shear rate of 500 sec$^{-1}$ Viscosity |
|---|---|---|---|---|---|---|---|
| Ex. 38 | 35 | 65 | 10 | 28 | 14 | 120 | 1,800 |
| Comp. Ex. 19 | 35 | 65 | 3 | 8.4 | 14 | 120 | Crystallized and insolubilized at ordinary temperature |
| Comp. Ex. 20 | 35 | 65 | 7 | 20 | 14 | 120 | Crystallized and insolubilized at 120° C. for 30 min. |
| Ex. 39 | 40 | 60 | 26 | 73 | 28 | 160 | 4,800 |
| Comp. Ex. 21 | 40 | 60 | 10 | 28 | 28 | 160 | Crystallized and insolubilized at 160° C. for several min. |
| Ex. 40 | 45 | 55 | 26 | 73 | 42 | 180 | 3,100 |
| Comp. Ex. 22 | 45 | 55 | 15 | 42 | 42 | 180 | Crystallized and insolubilized at 180° C. for several min. |
| Ex. 41 | 50 | 50 | 26 | 73 | 56 | 190 | 5,400 |
| Comp. Ex. 23 | 50 | 50 | 20 | 56 | 56 | 190 | Crystallized and insolubilized at 190° C. for several min. |

*[1] % based on the polymer

EXAMPLE 42

Following a procedure similar to that mentioned in Example 1, a polymer composition was prepared wherein poly-m-phenyleneisophthalamide, N-methyl-2-phrrolidone and calcium chloride were used instead of the terephthalic acid unit—containing poly-m-phenyleneisophthalamide, dimethylacetamide and lithium chloride, respectively. The amounts of these ingredients were also varied. That is the amounts of the polymer and the amide solvent were 33% and 67%, respectively, based on the total weight of the polymer and the amide solvent. The amount of calcium chloride was 32% by mole (30% by weight) based on the polymer, which amount was larger than the claimed minimum permissible amount, i.e., 10% by mole based on the polymer.

The polymer composition was extruded at a temperature of 95° C., through a nozzle having a slit 0.25 mm in width and 30 mm in length, into an aqueous coagulating bath maintained at a temperature of 95° C. The coagulating bath was comprised of an aqueous calcium chloride solution of a 40% concentration. The extrusion speed was 0.5 m/min. The film-like extrudate withdrawn from the coagulating bath was passed through a cold water bath, whereby the solvent and the solubilizing aid were removed from the film-like extrudate. The resultant film was transparent and had a thickness of 0.20 mm.

EXAMPLE 43

Following a procedure similar to that employed in Example 42, a polymer composition was prepared wherein the amounts of the polymer, the amide solvent and calcium chloride were changed as follows. The amounts of the polymer and the amide solvent were 37% and 63%, respectively, based on the total weight of the polymer and the amide solvent. The amount of calcium chloride was 32% by mole (30% by weight) based on the polymer, which amount was larger than the claimed minimum permissible amount, i.e., 10% by mole based on the polymer.

The polymer composition was extruded at a temperature of 160° C., through a T-die having a slit 0.15 mm in width and 15 mm in length, into the air. Then, the film-like extrudate was passed through a first coagulating bath, a second coagulating bath, and then, a cold water washing bath maintained at a temperature of 15° C. The first coagulating bath was comprised of an aqueous calcium chloride solution of a 37% concentration and was maintained at a temperature of 50° C. The second coagulating bath was comprised of an aqueous calcium chloride solution of a 43% concentration and was maintained at a temperature of 72° C. The film-like extrudate was then spread to twice its original length in the longitudinal direction by pressure rollers, and thereafter, dried while the length of the spread extrudate was maintained constant. The resultant film was 72 microns in thickness and had a tensile strength of 21.6 kg/mm$^2$, an elongation of 65% and a Young's modulus of 330 kg/mm$^2$.

EXAMPLE 44

Following a procedure similar to that employed in Example 42, a polymer composition was prepared wherein dimethylacetamide was used as the amide solvent instead of N-methyl-2-pyrrolidone. The amounts of the polymer, the amide solvent and calcium chloride were changed as follows, with all other conditions remaining substantially the same. The amounts of the polymer and the amide solvent were 30% and 70%, respectively, based on the total weight of the polymer and the amide solvent. The amount of calcium chloride was 32% by mole (30% by weight) based on the polymer, which amount was larger than the claimed minimum permissible amount, i.e., 10% by mole based on the polymer.

The polymer composition was extruded at a temperature of 150° C., through a die having a slit 0.1 mm in width and 20 mm in length, into the air. The extrusion rate was 10 ml/min. After being passed through the air over approximately 15 mm, the extrudate was introduced into a first coagulating bath, comprised of water maintained at a temperature of 5° C., where the extrudate was wound around a part of the periphery of a free-running roller, provided 10 cm below the liquid level of the coagulating bath. Then, the extrudate was withdrawn above the liquid level at a running speed of 6 m/min. The semitransparent film-like material, so obtained, was immersed in an aqueous calcium chloride solution of a 45% concentration, maintained at a temperature of 95° C., for approximately one minute, whereby the film-like material became transparent. Then, the film-like material was washed with water, drawn in boiling water to twice, its original length in the machine direction, and further, drawn one and-a-half times its length after the first drawing in a gaseous atmosphere maintained at a temperature of 350° C. The resultant film was tough and had good transparency.

EXAMPLE 45

Following a procedure similar to that employed in Example 43, a polymer composition was prepared wherein the amounts of the polymer, the amide solvent and calcium chloride were changed as follows, with all other conditions remaining substantially the same. The amounts of the polymer and the amide solvent were 40% and 60%, respectively, based on the total weight of the polymer and the amide solvent. The amount of calcium chloride was 32% by mole (30% by weight) based on the polymer, which amount was larger than the claimed minimum permissible amount, i.e., 28% by mole based on the polymer.

A film was prepared from the polymer composition in a manner similar that mentioned in Example 43. The resultant film was transparent and tough and had a thickness of 78 microns. Its tensile strength, elongation and Young's modulus were 18.1 kg/mm$^2$, 57% and 325 kg/mm$^2$, respectively.

EXAMPLE 46

A polymer composition similar to that obtained in Example 42 was extruded, by using an extruder having a diameter of 30 mm, through a T-die having a slit 0.1 mm in width and 500 mm in length, at a temperature of 120° C., onto a casting roller. The film-like material, so obtained, was passed through an aqueous 43% calcium chloride solution maintained at a temperature of 90° C., and then, through a cold water washing bath maintained below 10° C. Thereafter, the film-like material was drawn one and-a-half times its original length in the machine direction and, then, one and-a-half times its original length in the transverse direction, in hot water maintained at a temperature of 95° C. Then, the film-like material was dried while being maintained at a constant length. The resultant film was transparent and tough and had a thickness of 35 microns. Its tensile strength, elongation and Young's modulus were 16.3 kg/mm$^2$, 123% and 330 kg/mm$^2$, respectively.

EXAMPLE 47

Following a procedure similar to that employed in Example 43, a polymer composition was prepared wherein the amounts of the polymer, the amide solvent and calcium chloride were changed as follows, with all other conditions remaining substantially the same. The amounts of the polymer and the amide solvent were 45% and 55%, respectively, based on the total weight of the polymer and the amide solvent. The amount of lithium chloride was 98% by mole (35% by weight) based on the polymer, which amount was larger than the claimed minimum permissible amount, i.e., 42% by mole based on the polymer.

A film was prepared from the polymer composition in a manner similar that mentioned in Example 43. The resultant film was transparent and tough and had a thickness of 80 microns. Its tensile strength, elongation and Young's modulus were 14.5 kg/mm$^2$, 47% and 385 kg/mm$^2$, respectively.

EXAMPLE 48

Ten %, based on the weight of the polymer, of triallyl isocyanurate were incorporated in a polymer composition similar to that prepared in Example 42. Using the polymer composition so obtained, a film was prepared in a manner similar to that mentioned in Example 46, wherein the film-like extrudate was passed through an aqueous 43% calcium chloride solution, at a temperature of 90° C., over a period of one minute and, successively, through an aqueous 44% calcium chloride solution, at a temperature of 70° C., over a period of four minutes. All other conditions remained substantially the same as those employed in Example 46.

The resultant film was transparent and tough and had a thickness of 30 microns. Its tensile strength, elongation and Young's modulus were 17.3 kg/mm$^2$, 123% and 325 kg/mm$^2$, respectively.

EXAMPLE 49

37.5 parts of finely divided poly-m-phenyleneisophthalamide having an intrinsic viscosity of 1.32, 63.5 parts of dimethylacetamide and 3.8 parts (28.5% by mole based on the polymer) of finely divided lithium chloride were completely mixed together in an ice bath to obtain a paste. The paste was extruded at 140° C., by using a screw-type extruder and a gear metering pump, through a spinneret having five orifices, each 0.5 mm in diameter, into the air. The extrusion rate was 40 g/min. After being passed through the air for about two meters, the extruded filaments were wound around a roller dipped in water maintained at 25° C. and rotating at a peripheral speed of 80 m/min, and finally, taken up by a winder. The spinnability was good and the resulting filaments were homogeneous and had little or no loss of clarity. The filaments were drawn 2.3 times their original length on a hot pin, the surface of which was maintained at 120° C. The drawn filaments were washed with water, dried and then, further drawn 1.3 times their length after the first drawing on a hot plate maintained at 340° C. The drawn filaments were lustrous and homogeneous, and had the following properties.

Single filament fineness: 110 de
Tensile strength: 4.1 g/de
Elongation: 21%
Initial modulus: 95 g/de

EXAMPLE 50

30 parts of finely divided poly-m-phenyleneisophthalamide having an intrinsic viscosity of 1.35, 70 parts of N-methyl-2-pyrrolidone and 6 parts (21.5% by mole based on the polymer) of finely divided calcium chloride were completely mixed together in an ice bath, and then, the mixture was heated to 80° C. to obtain a uniform solution. The solution was extruded at 140° C. through a spinneret having five orifices, each 0.2 mm in diameter, into the air. The extrusion rate was 9.5 g/min. After being passed through the air for about 10 mm, the extruded filaments were introduced into a coagulating bath comprised of water and maintained at room temperature, and then, wound up on a roller rotating at a peripheral speed of 30 m/min. The resulting filaments were homogeneous and lustrous. Then, the filaments were washed with water, drawn two times their original length in hot water maintained at 90° C. and, then, dried on a drying roller. The filaments were further drawn 1.9 times their length after the first drawing on a hot plate maintained at 340° C., and then, taken up on a roll at a speed of 115 m/min. The resulting filaments were lustrous and had the following properties.
Single filament fineness: 44 de
Tensile strength: 5.1 g/de
Elongation: 18.5%
Initial modulus: 112 g/de

EXAMPLE 51

28 parts of finely divided poly-m-phenyleneisophthalamide having an intrinsic viscosity of 1.22, 72 parts of N-methyl-2-pyrrolidone and 4.2 parts (16.1% by mole based on the polymer) of finely divided calcium chloride were completely mixed together to obtain a uniform clear solution. The solution was extruded at 160° C. through a spinneret having five orifices each 0.08 mm in diameter into the air. The extrusion rate was 1.3 g/min. After being passed through the air over the length of about 10 mm, the extruded filaments were introduced into a first coagulating bath comprised of water and maintained at 18° C., and then, wound around a roller rotating at a peripheral speed of 40 m/min, and placed in a second coagulating bath comprised of an aqueous 40% calcium chloride solution and maintained at 95° C. Subsequently, the filaments were washed with water, drawn 1.6 times their original length in hot water maintained at 95° C. and, then, dried on a drying roller. The filaments were further drawn 2.8 times their length after the first drawing on a hot plate maintained at 340° C. The resulting filaments were homogeneous and lustrous, and had the following properties.
Single filament fineness: 3.4 g/de
Tensile strength: 4.8 g/de
Elongation: 22%
Initial modulus: 98 g/de

EXAMPLE 52

40 parts of finely divided poly-m-phenyleneisophthalamide having an intrinsic viscosity of 1.22, 60 parts of N-methyl-2-pyrrolidone and 14 parts (37.5% by mole based on the polymer) of calcium chloride were completely mixed together in an ice bath, and then, left to stand at ambient temperature to obtain a semi-solid mixture. The semi-solid mixture was extruded at 160° C., by using a screw-type extruder and a gear metering pump, through a spinneret, having one orifice 1.0 mm in diameter, into a spinning duct. The spinning duct was filled with a gaseous mixture of air and steam. The extrusion rate was 6.8 g/min. After being passed through the spinning duct for about 2 m, the extruded filament was dampened by using an oiling roller and, then, taken up by a roller rotating at a peripheral speed of 10 m/min. Thereafter, the filament was drawn 1.8 times its original length in the air and, then, washed with water. The filament was further drawn 1.5 times its length after the first drawing in hot water maintained at 95° C., washed completely with water and, then, dried. The dried filament was further drawn 1.4 times its length after the second drawing on a hot plate maintained at 340° C. The resulting filament was homogeneous and lustrous, and had the following properties.
Single filament fineness: 602 de
Tensile strength: 4.1 g/de
Elongation: 17.3%
Initial modulus: 83 g/de

EXAMPLE 53

37 parts of finely divided poly-m-phenyleneisophthalamide having an intrinsic viscosity of 1.22, 63 parts of N-methyl-2-pyrrolidone and 32.2% by mole, based on the polymer, of finely divided calcium chloride were completely mixed together. The mixture was extruded at 160° C. through a spinneret having five orifices, each 0.3 mm in diameter, into the air at a speed of 8 m/min. After being passed through the air for 10 mm, the extruded filaments were introduced into coagulating bath comprised of an aqueous 40% calcium chloride solution and maintained at 90° C. Then, the filaments were completely washed with water, drawn 2.5 times their original length in hot water maintained at 95° C. and, then, dried on a drying roller maintained at 120° C. The filaments were further drawn 1.2 times their length after the first drawing on a hot plate maintained at 350° C. and, then, wound up on a roll at a speed of 21 m/min. The resulting filaments had the following properties.
Single filaments fineness: 95 de
Tensile strength: 4.2 g/de
Elongation: 26%
Initial modulus: 101 g/de

EXAMPLES 54, 55 AND 56

Following a procedure similar to that employed in Example 53, polymer compositions were prepared and filaments were made therefrom, wherein the polymer compositions and the filament making conditions were varied as shown in Table IX, below. The coagulating bath used was comprised of an aqueous 43% calcium chloride solution and maintained at 90° C. All other conditions remained substantially the same. The resulting filaments had the properties shown in Table IX, below.

TABLE IX

| Ex. No. | Polymer composition*[1] | | Spinning conditions | | Drawing conditions (ratio, times) | | Filament properties | | | |
|---|---|---|---|---|---|---|---|---|---|---|
| | | | | | 95° C. | 350° C. | | Tensile | | Initial |
| | x | y | Temperature (°C.) | Speed (m/min) | Hot water | Hot plate | Fineness (de) | strength (g/de) | Elongation (%) | modulus (g/de) |
| 54 | 40 | 35 | 160 | 5 | 2.3 | 1.1 | 136 | 3.7 | 21 | 99 |
| 55 | 35 | 30 | 160 | 10 | 2.5 | 1.3 | 93 | 4.5 | 27 | 101 |
| 56 | 33 | 30 | 140 | 15 | 2.5 | 1.3 | 87 | 4.8 | 23 | 100 |

*[1] x: the amount in % by weight of the polyamide based on the total weight of the polyamide and the solvent.
y: the amount in % by mole of CaCl$_2$ based on the polyamide.

What we claim is:

1. An improvement in a process for preparing a film wherein an aromatic polyamide composition comprised of an aromatic polyamide, an organic amide solvent and a solubilizing aid is extruded by a wet-shaping procedure into a liquid coagulating bath, said improvement comprising extruding the aromatic polyamide composition through a nozzle or die having a slit into the air, and, immediately thereafter, introducing the extrudate into the liquid coagulating bath, said aromatic polyamide composition comprising (a) a polyamide, at least 75% by mole of the recurring structural units being comprised of m-phenyleneisophthalamide units and not more than 25% by mole of the recurring structural units being at least one other aromatic amide unit, (b) an organic amide solvent, and (c) at least one salt selected from the group consisting of chlorides of alkali metals and alkaline earth metals, and bromides of alkali metals, alkaline earth metals and ammonium; the amounts of the polyamide and the organic amide solvent being in the ranges of from 30% to 50% by weight and from 70% to 50% by weight, respectively, based on the total weight of the polyamide and the organic amide solvent, and the amount of said salt being defined by the formula:

$30 \leq X \leq 33.6$, $y \geq 10$, and $33.6 < x \leq 50$, $y > 2.8x - 84$ wherein x is the amount in % by weight of the polyamide based on the total weight of the polyamide and the organic amide solvent, and y is the amount in % by mole of said salt based on the polyamide, and said liquid coagulating bath being an aqueous inorganic salt solution containing 20 to 60% by weight, based on the weight of the solution, of an inorganic salt and maintained at a temperature of 40° to 110° C.

2. An improvement in a process for preparing a fiber wherein an aromatic polyamide composition comprised of an aromatic polyamide, an organic amide solvent and a solubilizing aid is extruded by a melt spinning procedure through a spinneret into a gaseous atmosphere, said improvement comprising extruding the aromatic polyamide composition through a spinneret into a gaseous atmosphere by a melt spinning procedure and, then, introducing the extrudate into a liquid coagulating bath, said aromatic polyamide composition comprising (a) a polyamide, at least 75% by mole of the recurring structural units being comprised of m-phenyleneisophthalamide units and not more than 25% by mole of the recurring structural units being at least one other aromatic amide units, (b) an organic amide solvent, and (c) at least one salt selected from the group consisting of chlorides of alkali metals and alkaline earth metals, and bromides of alkali metals, alkaline earth metals and ammonium; the amounts of the polyamide and the organic amide solvent being in the ranges of from 30% to 50% by weight and from 70% to 50% by weight, respectively, based on the total weight of the polyamide and the organic amide solvent, and the amount of said salt being defined by the formula:

$30 \leq x \leq 33.6$, $y \geq 10$, and $33.6 < x \leq 50$, $y > 2.8x - 84$ wherein x is the amount in % by weight of the polyamide based on the total weight of the polyamide and the organic amide solvent, and y is the amount in % by mole of said salt based on the polyamide, and said liquid coagulating bath being an aqueous inorganic salt solution containing 20 to 60% by weight, based on the weight of the solution, of an inorganic salt and maintained at a temperature of 40° to 110° C.

3. A process according to claim 1 wherein said aromatic polyamide composition is extruded in a molten state at a temperature of from 60° to 180° C.

4. A process according to claim 1 wherein the amide solvent is at least one compound selected from the group consisting of dimethylformamide, dimethylacetamide, N-methyl-2-pyrrolidone, tetramethylurea, hexamethylphosphoramide, N-methylpiperidone-2, N,N-dimethylethyleneurea, N,N,N',N'-tetramethylmalonamide, N-methylcaprolactam, N-acetylpyrrolidine, N,N-diacetylacetamide, N-ethylpyrrolidone-2, N,N-dimethylpropionamide, N,N'-dimethylisobutyramide and N,N-dimethylpropyleneurea.

5. A process according to claim 1 wherein the amount of said salt (c) is not larger than 60% by weight based on the weight of the polyamide.

6. A process according to claim 1 wherein said salt (c) is calcium chloride or lithium chloride.

7. A process according to claim 1 wherein said inorganic salt contained in the liquid coagulating bath is at least one inorganic salt selected from the group consisting of calcium chloride, barium chloride, zinc chloride, magnesium chloride, sodium chloride, potassium chloride, aluminum chloride, tin chloride, nickel chloride, strontium chloride, lithium chloride, calcium bromide, lithium bromide, calcium nitrate, zinc nitrate, aluminum nitrate, calcium thiocyanate, potassium thiocyanate and sodium thiocyanate.

8. A process according to claim 1 wherein said aromatic polyamide composition is extruded in a molten state at a temperature of from 60° to 180° C.

9. A process according to claim 2 wherein said aromatic polyamide composition, extruded through a spinneret into the gaseous atmosphere, is cooled in said gaseous atmosphere.

10. A process according to claim 2 wherein said gaseous atmosphere contains a vapor of a liquid capable of coagulating the extruded polyamide composition.

11. A process according to claim 2 wherein the amide solvent is at least one compound selected from the group consisting of compound selected from the group consisting of dimethylformamide, dimethylacetamide, N-methyl-2-pyrrolidone, tetramethylurea, hexamethylphosphoramide, N-methylpiperidone-2, N,N-dimethylethyleneurea, N,N,N',N'-tetramethylmalonamide, N-methylcaprolactam, N-acetylpyrrolidine, N,N-diacetylacetamide, N-ethylpyrrolidone-2, N,N-dimethylpropionamide, N,N-dimethylisobutyramide and N,N-dimethylpropyleneurea.

12. A process according to claim 2 wherein the amount of said salt (c) is not larger than 60% by weight based on the weight of the polyamide.

13. A process according to claim 2 wherein said salt (c) is calcium chloride or lithium chloride.

* * * * *